United States Patent
Cole et al.

(10) Patent No.: US 10,956,399 B1
(45) Date of Patent: Mar. 23, 2021

(54) TRANSACTION PIPELINING IN A JOURNALED DATABASE

(71) Applicant: Amazon Technologies, Inc., Seattle, WA (US)

(72) Inventors: Timothy Daniel Cole, Seattle, WA (US); John Michael Morkel, Seattle, WA (US); Allan Henry Vermeulen, Corvallis, OR (US); Christopher Richard Jacques de Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 15/199,852

(22) Filed: Jun. 30, 2016

(51) Int. Cl.
*G06F 16/23* (2019.01)
*G06F 16/18* (2019.01)
*G06F 16/27* (2019.01)

(52) U.S. Cl.
CPC ...... *G06F 16/2365* (2019.01); *G06F 16/1805* (2019.01); *G06F 16/2379* (2019.01); *G06F 16/27* (2019.01)

(58) Field of Classification Search
CPC ...... G06F 17/30; G06F 17/40; G06F 11/1662; G06F 16/27; G06F 16/2379; G06F 21/64
USPC .......................................... 707/703; 703/703
See application file for complete search history.

(56) References Cited

U.S. PATENT DOCUMENTS

| 2013/0036106 A1* | 2/2013 | Lucas | G06F 16/27 707/703 |
|---|---|---|---|
| 2016/0283201 A1* | 9/2016 | Wang | G06F 11/3604 |
| 2018/0239796 A1* | 8/2018 | Song | G06F 16/282 |

* cited by examiner

*Primary Examiner* — Marcin R Filipczyk
(74) *Attorney, Agent, or Firm* — Davis Wright Tremaine LLP

(57) ABSTRACT

A journaled database may comprise a computing node that forms a local version of a global state, synchronized with respect to the high-water mark of a data node that maintains the global state. Instructions to modify the state that have been committed, subsequent to forming the local version of the state, may be represented in a merge signature. An uncommitted transaction may be checked for conflicts with respect to a last-ordered committed instruction to modify the data state. Validation with respect to earlier instructions represented by the merge signature may be skipped.

17 Claims, 7 Drawing Sheets distributed system
100

TRANSACTION PIPELINING IN A JOURNALED DATABASE

BACKGROUND

Recently, distributed computing environments have been employed to maintain collections of data. Multiple computing nodes, potentially distributed across various geographic regions and data centers, may be employed to collectively provide applications with an efficient mechanism for storing and retrieving data. The complexity of such systems may increase in proportion to the number of computing nodes that make up the system and in proportion to the number of clients of the system. One issue that may arise involves efficient processing of updates to the collection of data, particularly when many clients are reading and writing to the same value.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
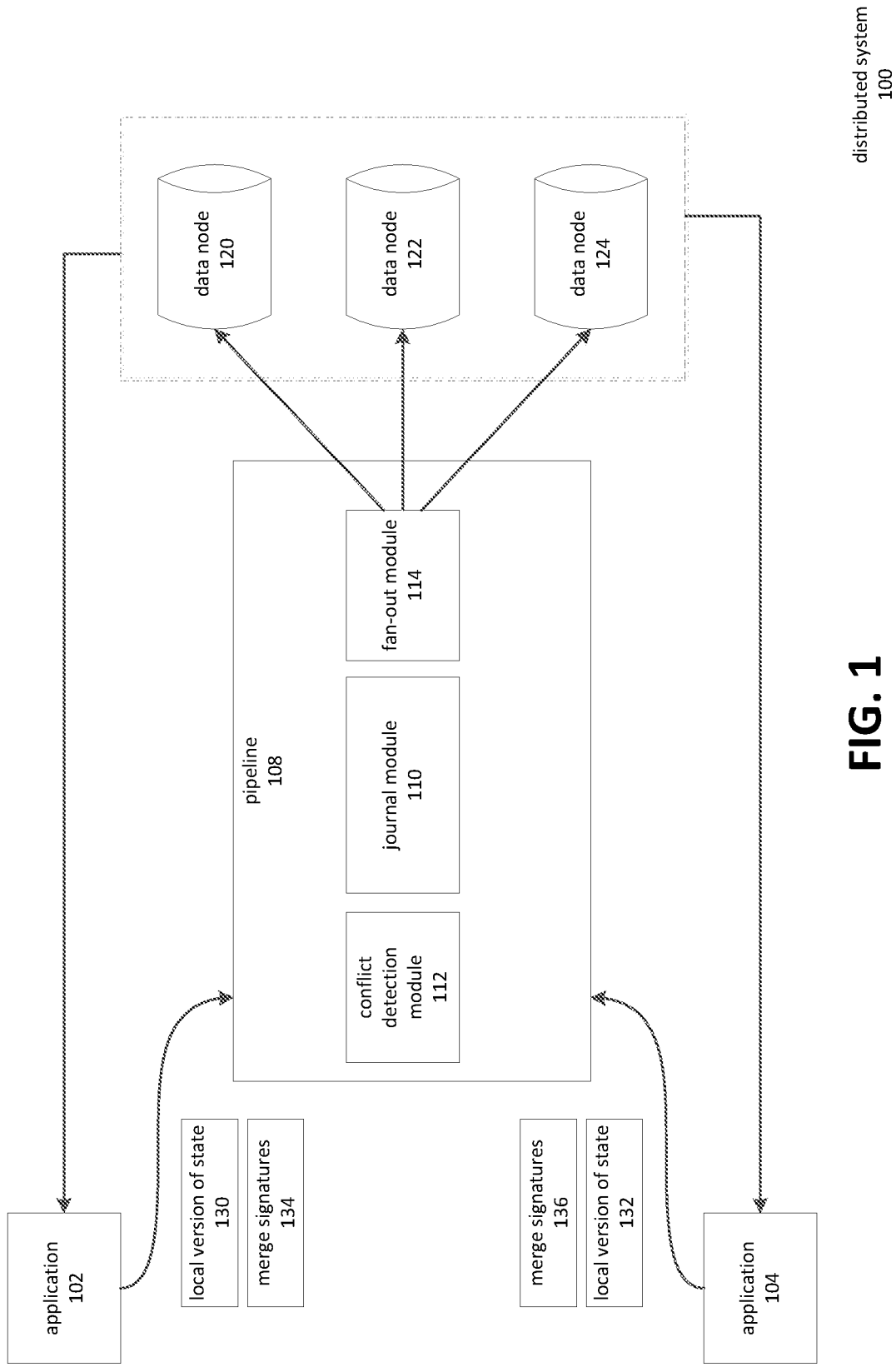
FIG. 1 is a block diagram depicting a distributed system with journaled updates.

Disclosed herein are systems, methods, and computer program products pertaining to distributed databases. Example embodiments may comprise a journaling component in which requests to modify the state of a collection of data are stored, by a pipeline component, prior to being analyzed for potential conflicts and then committed.

In an example, a system may comprise a storage device on which a collection of data may be maintained. The system may further comprise a first computing node in communication with the storage device, and on which a pipeline component may execute. The system may further comprise a second computing node which processes requests to modify the state of the collection of data.

The second computing node may, in response to a request to initiate a first transaction, form a copy of the current state of the collection. The copy may be referred to as an overlay of the global state of the collection, as a local version of the global state, or simply as a local version of the state. The copy may, in some instances, include a subset of the full collection of data. The copy may represent the synchronized state of the collection of data, or a subset thereof, as stored in a storage device of a data node.

The second computing node may receive indications of committed requests to modify the state of the global collection. These requests, or instructions, may be applied to the local version of the state, thus forming updated versions of the local version of the state. The second computing node may use the updated local version of the state to validate requests against local conflicts, although global conflicts may not be detectable using the local version of the state.

Each of the instructions to modify the global state may be associated with a sequence number obtained when the instruction was committed. The second computing node may store a representation of sequence numbers associated with the instructions. The representation may sometimes be described as a merge signature. The merge signature may represent the sequence numbers of the instructions to modify the global state of the collection of data.

The second computing node may receive an additional instruction to modify the state of the collection of data. The second computing node may transmit the additional instruction and the merge signature to the first computing node for validation. The first computing node may validate the additional instruction, particularly with respect to potential conflicts with other instructions. However, the first computing node may skip validation of the additional instruction with respect to instructions associated with one or more of the sequence numbers represented in the merge signature. For example, the first computing node may skip validation of the additional instruction for those instructions whose sequence numbers are represented in the merge signature, with the exception of the last-ordered sequence number.

The second computing node may process subsequent instructions by forming a new local version of the state based on the previous version. Typically, the initial version of the new local version of the state may be equivalent to the most recent previous local version of the state. A new merge signature may be formed, initially including the last-ordered merge signature of the previous transaction.

The examples described herein may address aspects of the journaling mechanism that relate to frequent updates to the same value within a collection of data. If many changes are made to the same value, the efficiency of the system may be limited by round-trip propagation time. That is to say that, in order to detect conflicting updates to the value, changes to the value might have to be fully propagated from a client device to the computing node that operates the journaling mechanism. However, embodiments as disclosed herein may improve efficiency of the system by allowing writes to proceed without propagation time being a primary constraint.

FIG. 1 is a block diagram depicting a distributed system 100 with journaled updates. In the distributed system 100, modifications to data are made using journaling, in which changes to data are recorded in a "journal" prior to being committed.

Data nodes 120-124 maintain a collection of data. Applications 102, 104 may obtain data from the data nodes 120-124. Data obtained from the data nodes 120-124 may be processed by the applications 102, 104. The applications 102, 104 may issue various commands to insert, update, and delete data on the data nodes 120-124. These commands may be issued through the pipeline 108.

The distributed system 100 may consist of a pipeline 108 in which requests to update data are stored prior to being committed. This allows applications 102, 104 to submit requests to change data without waiting to see if the operation was fully successful. This approach may be described as employing an optimistic concurrency model in which it is assumed that requests to modify data will generally be successful and conflicting modifications are detected at or shortly before the modifications are committed. Thus, the applications 102, 104 may generally submit requests and proceed under the assumption that a request to modify data has been successful, even though not yet committed. The pipeline 108 may store updates that are pending but not yet committed, subsequently confirm that the updates are valid, and then commit the updates. The validity of an update generally depends on whether the update conflicts with another pending update or the committed state of a corresponding data item.

A conflict detection module 112 may identify conflicts between a pending request to update the data state, other pending requests, and the current data state. Examples of conflicts include modifications to data that are based on out of date information. In some cases, an update to an item is based on the current value of the item—for example, incrementing a counter value by '1' suggests reading the current value of the counter and then adding the value '1' to the current value and storing the result. However, a conflict may arise if the current value becomes out-of-date before the incremented value is stored.

The journal module 110 may maintain a store of instructions to modify the data state. For example, the conflict detection module 112 might validate a request to increment a counter. If the request is validated, the journal module 110 might then store corresponding instructions to modify the data state on a storage device. The instructions may be stored by the journal module 110 so as to make the record of the instructions durable, so that the changes will be applied eventually to the data nodes 120-124 even in the event of a power interruption or other system failure. The journal module 110 may typically store instructions to modify the data state along with sequencing information, such as a global timestamp or serial number.

A fan-out module 114 may apply requested changes to counters maintained in the data nodes 120-124. The fan-out module 114 may, in some instances, commit the changes after receiving an indication that an operation does not conflict with any other unprocessed operation. In some instances, the data nodes 120-124 may contain replicas of dat. In such cases, the fan-out module 114 may apply a requested change to copies of the data stored on a plurality of the data nodes 120-124. The requested change may be deemed to be committed once the change has been applied to a quorum of the data nodes 120-124.

The applications 102, 104 may operate on snapshots of the current data state. Instructions to modify the data state may be continually processed by the pipeline 108, such that operations are performed on what might be described as eventually consistent replicas of the data state. For example, an application 102 may obtain a local version of the state 130 of a collection of data maintained by the data nodes 120-124. The collection of data may initially refer to the state of values maintained by the data nodes 120-124. Over time, as instructions to modify the state of the values are processed, the local version of the state 130 may become out of sync with the state as seen by other components, such as other applications 104 or the data nodes 120-124. The other applications 104 may maintain a local version of the state 132 corresponding to the same set of data, and its perspective or view of the data may also be out of sync with the first application 102 or the data nodes 120-124.

Figure 2:
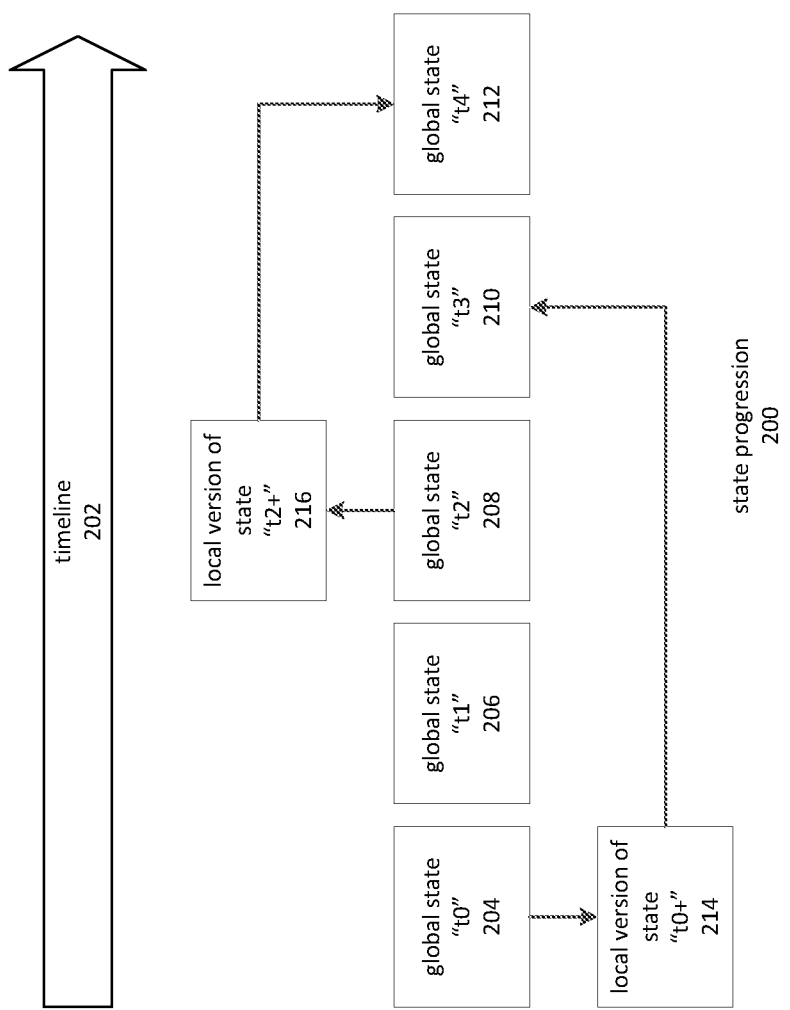
FIG. 2 is a block diagram depicting a global state of a collection of data and local versions of the global state.

FIG. 2 is a block diagram depicting a global state of a collection of data and local versions of the global state. The global state may be viewed in relation to a state progression 200. The state progression 200 involves a series of transitions of the global state, as changes pass through an update pipeline and are committed. Thus, the global state 204-212 may change over time. As depicted in FIG. 2, over a timeline 202 the global state 204-212 may pass through a number of state transitions. The global state 204 at time "t0" might transitions to the next global state 206 at time "t1," to a next global state 208 at "t2," and so on.

To avoid locking, an application may work with a snapshot of the global state while a transaction is in progress. For example, as depicted by FIG. 2, an application might work with a local version of the state 204, based on a snapshot taken at time "t0." Thus, in this example the local version of the state 214 may initially correspond to the global state 204 at time "t0."

The application may send instructions to change the global state through the pipeline while working with the local version of the state 214. Thus, over time the local version of the state 214 may diverge from the global state 204 on which it was based. The local version of the state 214 is therefore depicted in FIG. 2 as corresponding to a time "t0+."

An instruction or set of instructions may be associated with a sequence number. The sequence number may, in some instances, be globally unique and globally ordered. In some cases, the uniqueness and global ordering of the sequence numbers may be used to sequence application of the instructions on the pipeline. For example, for the purposes of committing the instructions to modify the state, earlier-issued instructions may take precedence over later-issued instructions in the event that the instructions conflict with each other. Sequence numbers may be associated with a transaction when committed. Accordingly, a merge signature may be representative of the sequence numbers of committed instructions to modify the state of a collection of data.

As depicted in FIG. 2, instructions based on the local version of the state 214 as of time "t0+" may be processed by the pipeline at a later time. In FIG. 2, the changes based on the local version of the state 214 as of time "t0+" may be applied by the pipeline to the global state 210 as of time "t3." A conflict may exist if any of the prior changes made to the global state 206-208 at times "t1" and "t2" are inconsistent with those made to the local version of the state 214.

Similarly, another application might utilize a local version of the state 216 taken based on the global state 208 as of time "t2." As depicted by FIG. 2, these changes might be applied to the global state 212 at time "t4." These changes might conflict with the changes made at time "t3." In the example depicted by FIG. 2, these would be the changes applied to the local version of the state 214 based on time "t0."

Figure 3:
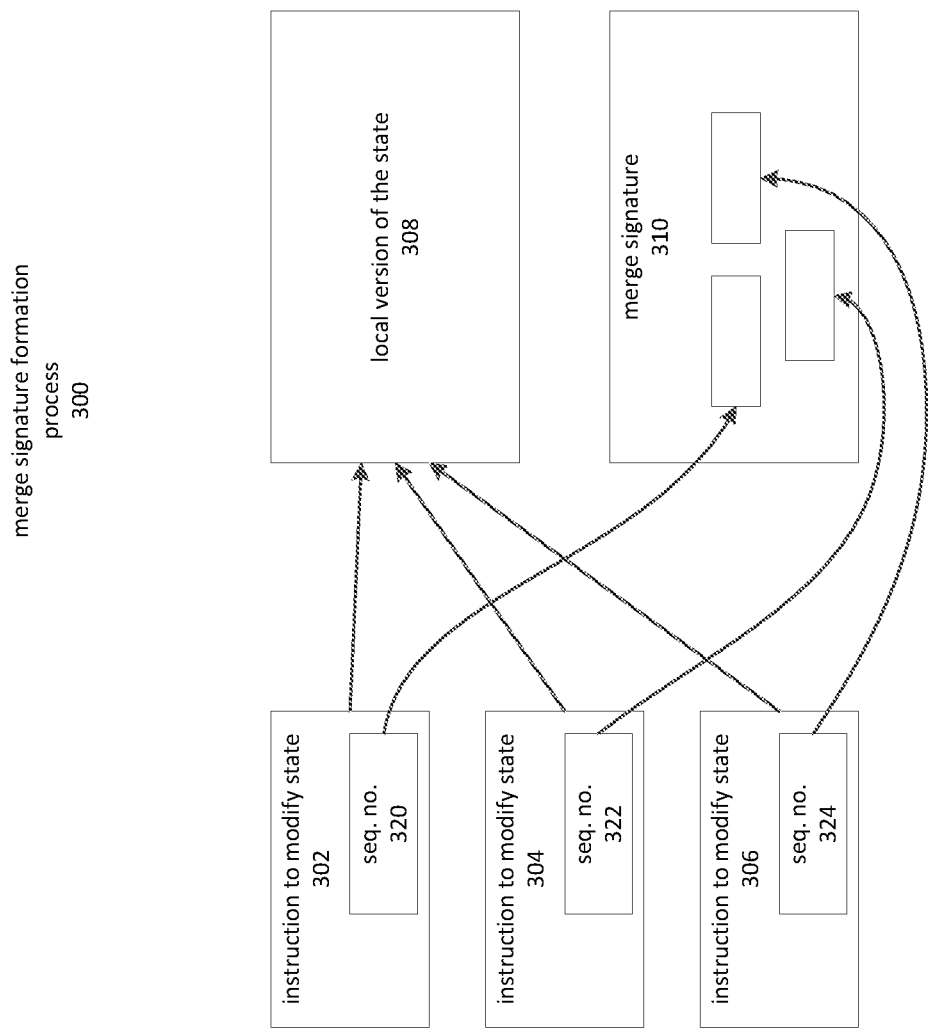
FIG. 3 depicts a process for forming merge signatures.

FIG. 3 is a block diagram depicting a process for forming merge signatures. A merge signature formation process 300 may involve receive a series of instructions to modify the global state 302-306 that have been committed against a global state 314 and assigned corresponding sequence numbers 320-322. The instructions 302-306 may be assumed, for exemplary purposes, to be made by an application working against a local state 308. The local version of the state 308 may be based on a subset of a global state. The local version of the state 308 may, with reference to FIG. 2, be based on a version of the global state 204-212 at some reference time, such as "t0" Thus, the local version of the state 308 may be a version of the global state, and may vary over time as the transactions 302-306 are issued. The local version of the state 308 may, for example, be updated when the first instruction 302 is submitted to the pipeline, again when the second instruction 304 is submitted to the pipeline, and again when the third instructions 306 is submitted to the pipeline. Each successive transaction may reference the local version of the state 308. For example, if the first instruction 302 modifies a value "V=10," and the second instruction 304 reads the value "V," adds "5" to it, and stores the result, the local version of the state 308 would reflect "V=15."

Each of the committed instructions 302-306 may be associated with a corresponding sequence number 320-324. The sequence numbers may, in some instances, be globally unique and globally ordered. In some instances, the sequence numbers may comprise approximations of globally unique and ordered values. In some instances, the sequence numbers may be locally unique and ordered. These sequence numbers may, in some instances, be translated to a global space in which the sequence numbers 320-324 are at least approximately unique and ordered.

A merge signature 310 may be formed to represent the sequence numbers 320-324. Conceptually, the merge signature 310 may be described as a list of the sequence numbers 320-324 for instructions that have been applied to the local version of the state 308. In some instances, the list of sequence numbers 320-324 may be stored in a compressed representation such as a hash-based structure. Probabilistic data structures such as bloom filters might also be employed.

The merge signature 310 may be used during pipeline processing 312 to improve conflict detection. The merge signature 310 may be used to determine whether particular transactions may be skipped for the purposes of conflict detection.

Figure 4:
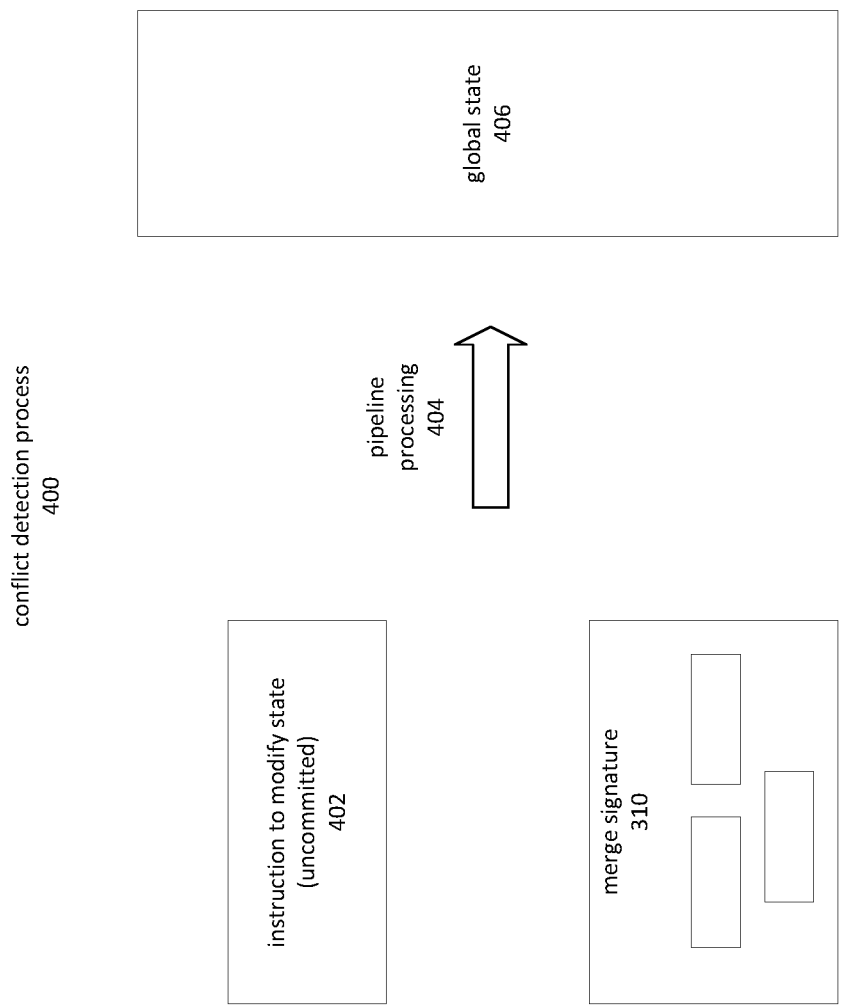
FIG. 4 depicts a process for conflict detection using merge signatures.

FIG. 4 is a block diagram depicting a process for conflict detection using merge signatures. A conflict detection process 400 may be applied to an uncommitted instruction to modify the global state 406. The conflict detection process 400 may involve validating the uncommitted instruction 402 against the most recent instruction represented by a merge signature 310, while not validating the uncommitted transaction against instructions represented by earlier instructions, as represented in the merge signature 310. The pipeline processing component 404 of the system may rely on these instructions having already been validated.

When determining if the uncommitted instruction 402 conflicts with a prior instruction, the pipeline processing component 404 may skip validation of instructions that correspond to sequence numbers represented in the merge signature 310. For example, the pipeline processing component 404 may identify the range of sequence numbers for the series of instructions 302-306 that have been applied to the local version of the state 308. The pipeline processing component 404 may then skip validation for the instructions that fall into this range.

A merge signature may be represented using a list of sequence numbers, a hash table, a queue, and so forth. The structure used may be selected for compactness, particularly if the number of sequence numbers per transaction is typically very high. The structure may, in some instances, be tuned to favor false negatives or false positives. In some applications, false negatives may indicate that a sequence number is not represented in the signature, even when it is. A consequence of false negatives is that the validation stage of the pipeline may perform more work by validating an instruction that would not otherwise be validated. Conversely, a false positive may indicate that a signature is present when it is not. This may be problematic, because it may cause the system to skip validation. However, in some circumstances the benefits of the false positive—which may include a more compact representation for the merge signature or improved speed—may outweigh the negatives, such as the potential to skip validation of an instruction to modify the state.

The pipeline processing stage may determine which instructions to modify the data state may be skipped on a per-identifier basis. Note that in some cases, similar principles may be employed to subsets of the data state larger than an individual item, such as a row of values, a table, or a subset of a collection of data. The row, table, or subset might also be associated with an identifier or some other means of distinguishing relevant entries in the merge signature.

As noted, the pipeline processing stage may identify sequence numbers associated with a particular identifier and determine to skip validation of some or all of the corresponding requests to modify the data state as it pertains to the identified data. For example, for a particular name-value pair, the pipeline might ignore all but the most recent instruction to modify the value of the name-value pair might be ignored for conflict detection purposes. In other words, the final value of a sequence of changes to the value of the name-value pair might be compared to a potentially conflicting change made to the same value by another application. However, earlier changes to the value might be ignored.

Figure 5:
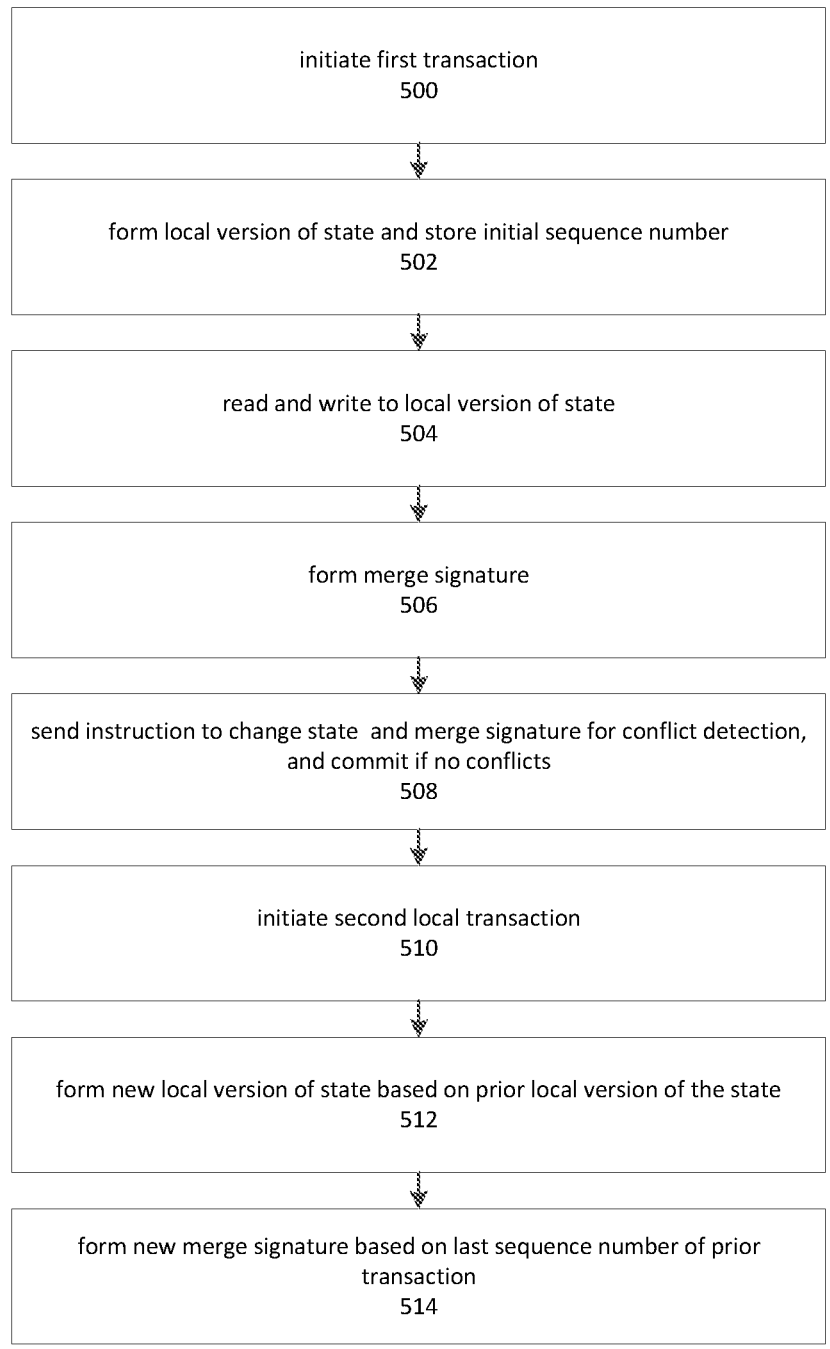
FIG. 5 is a flow chart depicting a process for updating data in a journaled database.

FIG. 5 is a flow chart depicting a process for updating data in a journaled database. Although depicted as a sequence of blocks, those of ordinary skill in the art will appreciate that the depicted order should not be construed as limiting the scope of the present disclosure and that at least some of the operations represented by the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 500 depicts initiating a first transaction. The first transaction may include a series of operations on one or more data items. The results of the operations may be intended to be committed as an atomic operation. The results of the operation may be verified to ensure that they do not conflict with other transactions committed prior to the first transaction. If such a conflict exists, the modifications associated with the first transaction may not be committed.

As depicted by block 502, a local version of the state of the data state may be formed in response to initiating the first transaction. Block 502 also depicts storing the sequence number associated with the start of the transaction.

The local version of the state may be formed by copying relevant values obtained as a snapshot of the global state. In many instances, it may be impractical to store a complete representation of the global data state. Thus, forming the local version of the state may comprise copying the current values of data that is to be manipulated by the transaction. This may be done on-demand, which is to say that as instructions to modify the data state are received, the relevant current values may be obtained.

The local version of the state may correspond to a subset of the collection of data maintained on a data node. The version of the state may be synchronized with respect to the collection of data as it is maintained on the data node. For example, the collection of data on the data node (or in particular on a storage device to which the data node is in communication) may be synchronized up to a sequence number $S_n$. The local version of the state may therefore also be synchronized up to the sequence number $S_n$, and instructions committed subsequent to that point may be represented in the merge signature.

Block 504 depicts reading and writing to the local version of the state. This may include write operations which may be sent through the pipeline and committed. When committed, the instructions may be assigned sequence numbers that may then be incorporated into a merge signature.

Block 506 depicts forming data indicative of instructions that have been merged into the global state. These instructions may also have been applied to the local version of the state. This data, representative of state changes that have been integrated into the collection of data, may be referred to as a merge signature. As discussed herein, for example referring to FIG. 4, this may comprise a data structure, maintained in memory, which is a representation of a hash space. The merge signature may be maintained by adding, for each instruction to modify the global state, a representation of a corresponding sequence number to the merge signature.

The merge signature may be viewed as representing instructions that are above a high-water mark of instructions that have been applied to a data node. In other words, a stream of instructions may be committed (e.g. made durable) in the pipeline and subsequently applied to a data node. These instructions may be associated with a sequence number. The sequence number of the most recent instruction to have been applied to the data node may be described as the high-water mark. The local version of the data state may be formed to initially represent the corresponding version of the data state, i.e. the data state corresponding to the high-water mark. Subsequent instructions may have been committed but not yet applied. These instructions, which may be described as being above the high-water mark, may be represented in a merge signature.

Block 508 depicts sending an additional instruction, not yet committed, to change the data state. The instruction may be sent to the pipeline for validation, and may be accompanied by a merge signature representative of prior committed instructions. The pipeline may validate the additional instruction using the merge signature. The additional instruction may be validated with respect to the last-ordered, i.e. the most recent, instruction represented in the merge signature. Validation of the additional instruction with respect to earlier instructions in the merge signature may be skipped. This approach may result in improved efficiency in the process of detecting conflicts.

Block 510 depicts initiating a second transaction. The second transaction may be initiated and processed while the first is being processed by the pipeline and has not yet been committed. In association with beginning the second transaction, a new local version of the state may be constructed, as depicted by block 512. The new local version of the state may be based on the modified version of the local state, as it existed at the close of the first transaction.

Block 512 depicts forming a new merge signature based on the last sequence number of the first transaction. The new merge signature, corresponding to the second transaction, may initially consist of a representation of the last sequence number of the first transaction. As additional instructions to modify the state are issued, in association with the second transaction, the corresponding sequence numbers may then be added to the merge signature.

Figure 6:
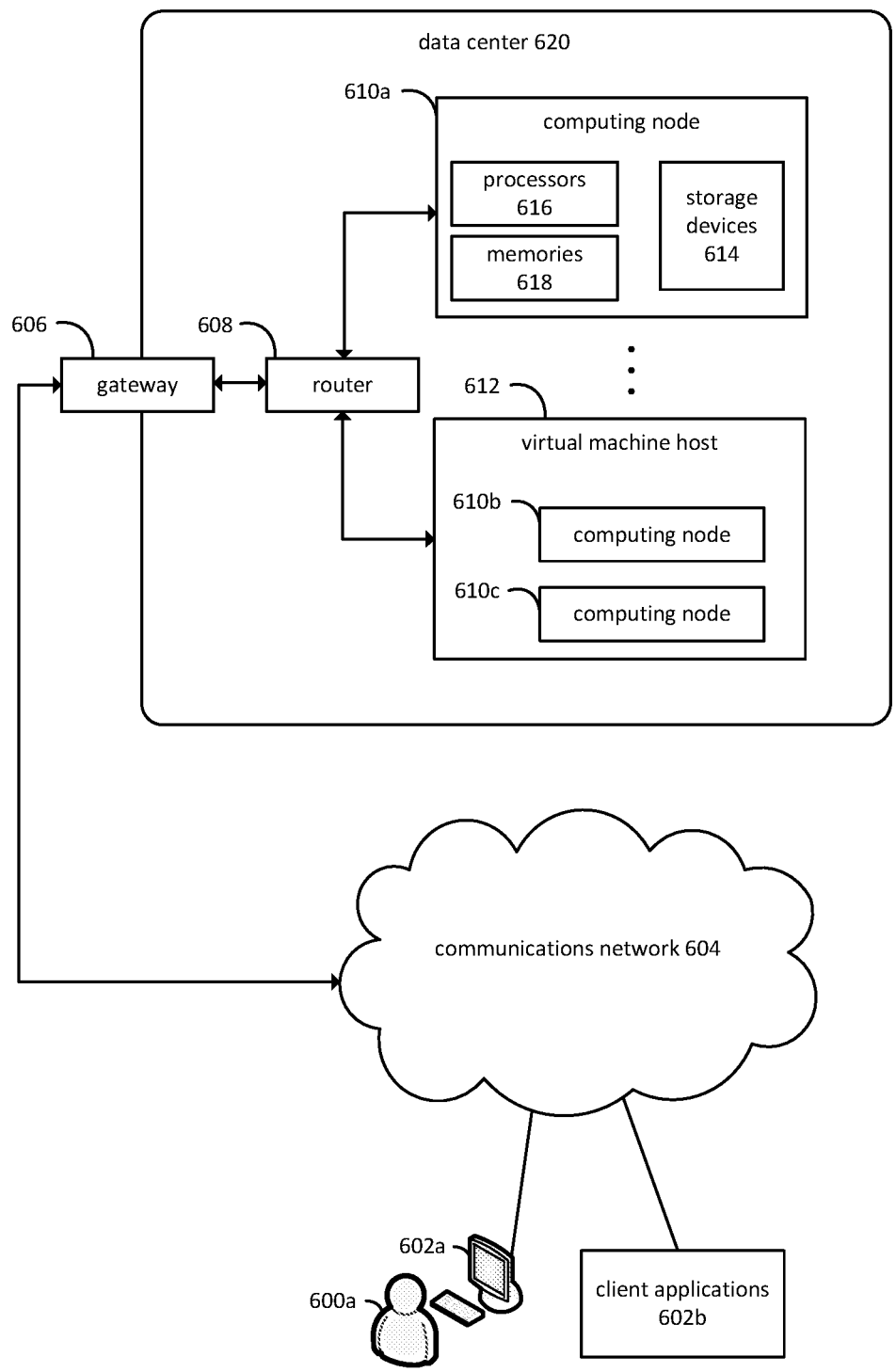
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
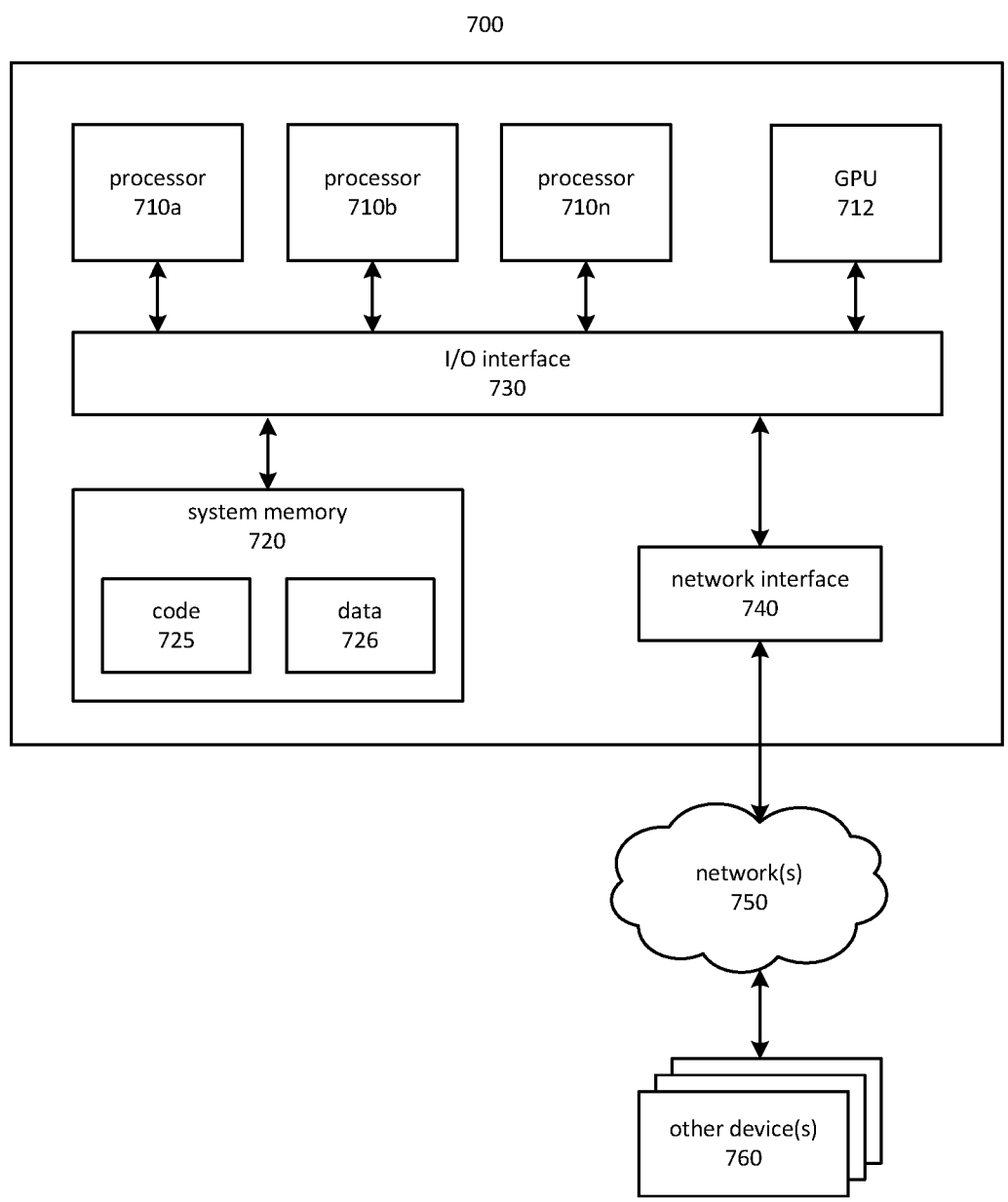
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 800 includes one or more processors 710a, 710b, and/or 710n (which may be referred herein singularly as a processor 710 or in the plural as the processors 710) coupled to a system memory 720 via an input/output ("I/O") interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect ("PCI") bus standard or the Universal Serial Bus ("USB") standard, for example. In some embodiments, the function of I/O interface 730 may be split into two or more separate components, such as a north bridge and a south bridge, for example. Also, in some embodiments some or all of the functionality of I/O interface 730, such as an interface to system memory 920, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
    a storage device configured to store thereon a collection of data;
    a first computing node in communication with the storage device; and
    a second computing node that at least:
        forms a first version of a state of the collection of data;
        modifies the first version of the state of the collection of data, based at least in part on a first plurality of instructions to modify the state of the collection of data, the first plurality of instructions corresponding to a first plurality of sequence numbers;
        stores, in a first data structure, a first data comprising information representative of the first plurality of sequence numbers, wherein the first data structure is a first merge signature stored as a compressed representation of the first plurality of sequence numbers;
        receives a second instruction to modify the state of the collection of data;
        sends information indicative of validating the second instruction to the first node, the information comprising the first data, wherein validating the second instruction, by the first node, comprises validating the second instruction with respect to potential conflicts with one or more other instructions and skipping validation of one or more of the first plurality of instructions corresponding to sequence numbers represented by the first data;
        forms a second version of the state of the collection of data, the second version of the state associated with a second transaction, the second version of the state formed to initially correspond to the modified first version of the state; and
        stores in a second data structure information representative of sequence numbers associated with the second transaction, the second data structure initially comprising information representative of a last sequence number of the first plurality of sequence numbers.

2. The system of claim 1, wherein the first data structure comprises a list of the first plurality of sequence numbers.

3. The system of claim 1, wherein the first plurality of sequence numbers correspond to an ordering of the first plurality of instructions.

4. The system of claim 3, wherein validating the second instruction comprises validating the second instruction with respect to a state associated with a last-ordered sequence number of the first plurality of sequence numbers.

5. A method comprising:
    forming a first version of a state of a collection of data in response to a request to initiate a first transaction;
    modifying the first version of the state based at least in part on a first plurality of instructions to modify the state of the collection of data, the first plurality of instructions corresponding to a first plurality of sequence numbers;
    storing, in a first data structure, a first data to represent the first plurality of sequence numbers, wherein the first data structure is a first merge signature stored as a compressed representation of the first plurality of sequence numbers;
    receiving a second instruction to modify the state of the collection of data;
    sending information indicative of validating the second instruction to a first node, the information comprising the first data, wherein validating the second instruction, by the first node, comprises validating the second instruction with respect to potential conflicts with one or more other instructions and skipping validation of one or more of the first plurality of instructions corresponding to sequence numbers represented by the first data; and
    forming a second version of the state of the collection of data, the second version of the state associated with a second transaction, the second version of the state formed to initially correspond to the modified first version of the state; and
    storing in a second data structure information representative of sequence numbers associated with the second transaction, the second data structure initially comprising information representative of a last sequence number of the first plurality of sequence numbers.

6. The method of claim 5, further comprising:
validating the second instruction to modify the state of the collection of data, the validating based on a last instruction, of the first plurality of instructions, corresponding to a last-ordered sequence number of the first plurality of sequence numbers.

7. The method of claim 5, wherein the first plurality of instructions correspond to instructions to modify the state of the collection of data received subsequent to forming the first version of a state of the collection of data.

8. The method of claim 5, wherein a sequence number of the first plurality of sequence numbers corresponds to a global ordering of an instruction to modify the state.

9. The method of claim 5, wherein the first version of the state of the collection of data is synchronized with respect to the collection of data prior to receiving the first plurality of instructions to modify the state of the collection of data.

10. The method of claim 5, further comprising:
reading a data value from the modified first version of the state; and
forming a request to modify the state, the request based at least in part on the data value read from the modified first version of the state.

11. The method of claim 5, wherein the first data comprises a list of the plurality of sequence numbers.

12. A non-transitory computer-readable storage medium comprising executable instructions that, upon execution by a first computing device, cause the first computing device at least to:
form a first version of a state of a collection of data;
modify the first version of the state of the collection of data based at least in part on a first plurality of instructions to modify the state of the collection of data, the first plurality of instructions corresponding to a first plurality of sequence numbers;
storing, in a first data structure, a first data comprising information representative of the first plurality of sequence numbers, wherein the first data structure is a first merge signature stored as a compressed representation of the first plurality of sequence numbers;
send, to a second computing device, in response to a second instruction to modify the state of the collection of data, a request to validate the second instruction, the request comprising the first data, wherein validating the second instruction, by the second computing device, comprises validating the second instruction with respect to potential conflicts with one or more other instructions and skipping validation of one or more of the first plurality of instructions corresponding to one or more sequence numbers represented by the first data;
forming a second version of the state of the collection of data, the second version of the state associated with a second transaction, the second version of the state formed to initially correspond to the modified first version of the state; and
storing in a second data structure information representative of sequence numbers associated with the second transaction, the second data structure initially comprising information representative of a last sequence number of the first plurality of sequence numbers.

13. The non-transitory computer-readable storage medium of claim 12, comprising further instructions that, upon execution by the first computing device, cause the first computing device to at least:
validate the first plurality of instructions to modify the state of the collection of data, the validating based on the modified first version of the state.

14. The non-transitory computer-readable storage medium of claim 12, wherein a sequence number of the first plurality of sequence numbers corresponds to a global ordering of an instruction to modify the state.

15. The non-transitory computer-readable storage medium of claim 14, wherein the second computing device is to at least:
skip validation of the second instruction relative to instructions other than a last-ordered instruction represented by the first data.

16. The non-transitory computer-readable storage medium of claim 12, wherein the second computing device is to at least:
validate an instruction, of the first plurality of instructions, corresponding to a last-ordered sequence number represented by the first data.

17. The non-transitory computer-readable storage medium of claim 12, wherein the first version of the state of the collection of data corresponds to a subset of data of a collection of data maintained on a storage device by a computing node.

* * * * *